(12) United States Patent
Miura et al.

(10) Patent No.: US 7,982,900 B2
(45) Date of Patent: Jul. 19, 2011

(54) DATA PROCESSING METHOD, PROGRAM, AND DATA PROCESSING SYSTEM FOR REPRINTING TEMPLATE AND SLIP DATA

(75) Inventors: Kiyotaka Miura, Kanagawa (JP); Tsunehiro Tsukada, Kanagawa (JP); Keiichi Takashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1313 days.

(21) Appl. No.: 10/361,775

(22) Filed: Feb. 11, 2003

(65) Prior Publication Data

US 2003/0154395 A1 Aug. 14, 2003

(30) Foreign Application Priority Data

Feb. 13, 2002 (JP) ................................ 2002-035773
Jan. 28, 2003 (JP) ................................ 2003-018905

(51) Int. Cl.
*G06K 15/00* (2006.01)
(52) U.S. Cl. ..................... 358/1.16; 358/1.14; 358/1.15; 283/60.1
(58) Field of Classification Search ................. 358/1.14, 358/1.15, 1.16; 283/60.1; 705/29; 707/1, 707/3, 9, 200, 204
See application file for complete search history.

(56) References Cited

U.S. PATENT DOCUMENTS

| 5,999,707 | A * | 12/1999 | Taniguchi et al. | 358/1.15 |
| 6,089,765 | A * | 7/2000 | Mori | 400/61 |
| 6,115,132 | A * | 9/2000 | Nakatsuma et al. | 358/1.14 |
| 7,027,179 | B2 * | 4/2006 | Mori | 358/1.18 |
| 7,184,157 | B2 * | 2/2007 | Dennison et al. | 358/1.15 |
| 7,268,910 | B2 * | 9/2007 | Catt et al. | 358/1.18 |
| 7,286,251 | B2 * | 10/2007 | Tomida et al. | 358/1.15 |
| 2002/0063891 | A1 | 5/2002 | Ueda et al. | 358/1.15 |
| 2002/0063892 | A1 | 5/2002 | Tsukada | 358/1.15 |
| 2002/0176112 | A1 | 11/2002 | Miura | 358/1.18 |

FOREIGN PATENT DOCUMENTS

| CN | 1264862 A | 8/2000 |
| EP | 0867805 A1 | 9/1998 |
| JP | 8-221227 | 8/1996 |
| JP | 2001-75748 | 3/2001 |
| WO | 01/93057 A1 | 12/2001 |

OTHER PUBLICATIONS

Chinese Office Action concerning Application No. 200810211183.6.
EP Office Action dated Apr. 18, 2011 regarding Application No. 07-108959.3-1245.

* cited by examiner

*Primary Examiner* — Mark K Zimmerman
*Assistant Examiner* — Peter K Huntsinger
(74) *Attorney, Agent, or Firm* — Fitzpatrick, Cella, Harper & Scinto

(57) ABSTRACT

In a system for transmitting print data from a server apparatus for forming the print data to a client apparatus and performing print based on the print data, it is an object of the invention to improve security of printed matter by inhibiting reprint using the print data stored in the client apparatus and improve operability upon reprinting.

24 Claims, 7 Drawing Sheets

DATA PROCESSING METHOD, PROGRAM, AND DATA PROCESSING SYSTEM FOR REPRINTING TEMPLATE AND SLIP DATA

BACKGROUND OF THE INVENTION

1. Field of the Invention

The invention relates to a network data processing system including client apparatuses and a server apparatus which are connected via a network such as Internet or the like, wherein the server apparatus forms data to print a document such as a slip or the like on the basis of a request from the client apparatus and transmits the formed data to the client apparatus.

2. Related Background Art

In recent years, with the spread of the Internet, there is a tendency such that office work is done by the Web, and print work of a slip and the like is no exception. It has become common that the slips of high quality are printed by an instruction from a Web browser. In such a case, a Web server forms print data to print the slip and distributes it to a client side.

On the client side, after a printing apparatus prints the print data, the print data is under the management of the client. Therefore, the printing apparatus can reprint on the basis of the print data. However, if printed matter is a sheet such as receipt, certificate, or the like whose security is important and which is not allowed to be pluralized, after a normal finish of the print, it is necessary to erase the print data on the client.

On the other hand, there is a case where it is demanded that the reprint can be performed. In such a case, a system needs to cope with the reprint. Therefore, hitherto, in the case of performing the reprint, under a severe watch in the conduct of business, the user reinputs data for forming a slip by the Web browser and the Web server remakes the print data.

SUMMARY OF THE INVENTION

However, the above conventional technique has the following problems.

In the case of allowing the reprint using the print data stored in the client, the server has to manage a present situation of the print data transmitted to each client and there is a possibility that the reprint using the print data stored in the client is executed without permission in a place where the watch of the server is incomplete.

On the other hand, if the reprint using the print data stored in the client is inhibited, the user has to execute completely the same data input as the previous data input by the Web browser in order to reprint the same printed matter, so that the operation for reprinting is complicated. For example, it is very difficult to perform the same data input as the data input executed by another user.

The invention is made in consideration of the foregoing problems and it is an object of the invention to improve security of printed matter by inhibiting the reprint using the print data stored in the client and improve operability upon reprinting.

DETAILED DESCRIPTION OF THE PREFERRED EMBODIMENT

First, an outline of an embodiment of the invention will be described. According to the embodiment of the invention, in a network print system in which a server apparatus, client apparatuses, and a printing apparatus are connected by a network, each client apparatus deletes image data for printing (print data) received from the server apparatus after completion of print in the printing apparatus. The server apparatus manages print history information based on the print in the printing apparatus. When there is a request for reprinting from the client apparatus to the server apparatus, the server apparatus enables only the user (authorized person) in authority who can access the server apparatus to execute the operation regarding the reprint. Particularly, the server apparatus holds the print data included in the print history information, thereby enabling the authorized person in authority to easily reprint. The embodiment of the invention will be described hereinbelow in detail with reference to the drawings.

Figure 1:
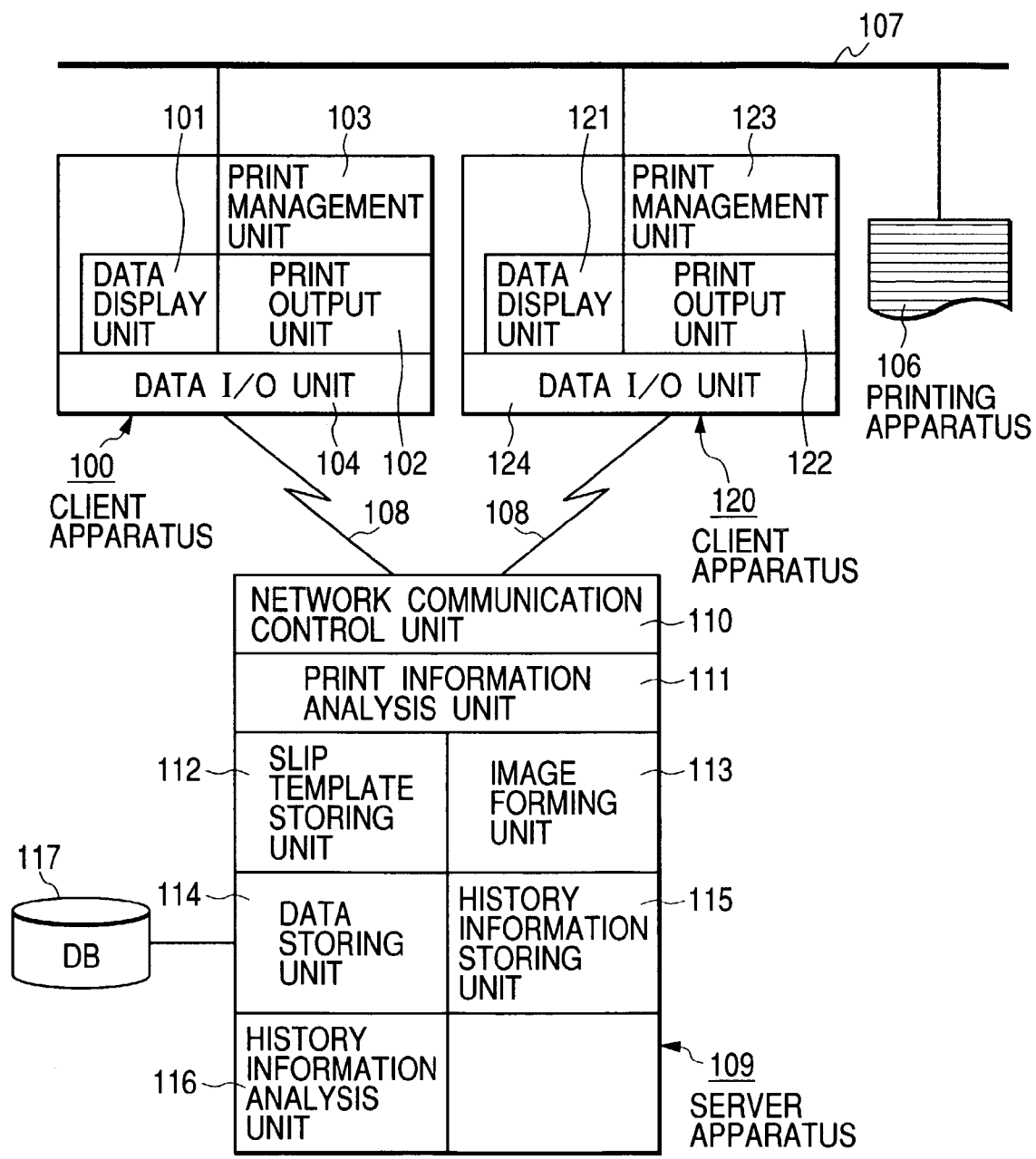
FIG. 1 is a block diagram showing a functional construction of a network print system.

FIG. 1 is a block diagram showing a functional construction of the network print system according to the embodiment of the invention. In the network print system, a client apparatus 100 has a data display unit 101, a print output unit 102, a print management unit 103, and a data input/output unit (data I/O unit) 104. A client apparatus 120 has a data display unit 121, a print output unit 122, a print management unit 123, and a data input/output unit 124. A server apparatus 109 has a network communication control unit 110, a print information analysis unit 111, a slip template storing unit (unit for storing a template for a slip) 112, an image forming unit 113, a data storing unit 114, a history information storing unit 115, a history information analysis unit 116, and a database 117. In the diagram, reference numerals 107 and 108 denote networks. The network 108 can be constructed by a plurality of networks as shown in the diagram or can be constructed by one network.

A printing apparatus 106 prints onto a recording medium on the basis of the print data. As a printing apparatus 106, there is a laser beam printer of an electrophotographic system, an ink jet printer of an ink jet system, or the like.

The above construction will now be described in detail. The client apparatuses 100 and 120 are constructed as personal computers (PCs). In the client apparatus 100, the data display unit 101 displays data necessary for a slip and performs a preview of image data for printing. The print output unit 102 receives the image data for printing from the server apparatus 109 via the data I/O unit 104 and converts it into data which can be processed by the printing apparatus 106. For example, if the printing apparatus 106 is a PDL (Page Description Language) printer, the image data for printing is converted into data described by the PDL. The print management unit 103 is a characteristic portion of the invention and receives a notification showing whether the print has normally been finished in the printing apparatus 106 or not from the print output unit 102. The data I/O unit 104 transmits variable data which is necessary for the slip to the server apparatus 109 and receives the image data for printing which is transmitted from the server apparatus 109. Since a construction of each unit of the client apparatus 120 is similar to that of the client apparatus 100, its explanation is omitted.

The printing apparatus 106 executes the printing operation on the basis of the image data for printing which is transmitted from the client apparatus 100 or the client apparatus 120. The network 107 is an inhouse network such as a LAN (Local Area Network) or the like. The network 108 is a network for connecting the server apparatus 109 installed in a remote place and the client apparatus 100 or the client apparatus 120 and is mainly a network such as Internet or the like.

The server apparatus 109 is constructed as a computer. In the server apparatus 109, the network communication control unit 110 controls transmission and reception of data between the client apparatuses 100 and 120. The print information analysis unit 111 analyzes the variable data which is received from the client apparatus 100 or the client apparatus 120 and is necessary for the slip and controls a response to the client apparatus 100 or the client apparatus 120, creation of slip forming data in the server apparatus 109, or the like. Template data for the slip has been stored in the slip template storing unit 112. The image forming unit 113 forms the image data for printing. That is, when the print information analysis unit 111 forms the data for the slip which is necessary for forming (printing) the slip on the basis of the variable data necessary for the slip, the data for the slip and the template data for the slip which has been stored in the slip template storing unit 112 are transferred to the image forming unit 113. The image forming unit 113 synthesizes the data for the slip and the template data for the slip, thereby forming the image data for printing. Either raster image data or vector image data can be used as image data for printing. It is unnecessary that the image data for printing is the image data which is used only for printing, but it can be also image data which is used for displaying and printing.

The data for the slip formed by the print information analysis unit 111, information indicative of the template data for the slip stored in the slip template storing unit 112, and the like are stored in the data storing unit 114. Various information serving as sources of the data for the slip has been stored in the database 117. For example, member information regarding members of a company, customer information regarding customers, and the like have been stored in the database 117. On the basis of those information, the data for the slip necessary for forming the slip is formed. The history information storing unit 115 is a characteristic portion of the invention and stores print history information regarding the print based on the image data for printing. The history information analysis unit 116 is likewise a characteristic portion of the invention and executes creation, analysis, and the like of the print history information as shown in FIG. 2.

Figure 2:
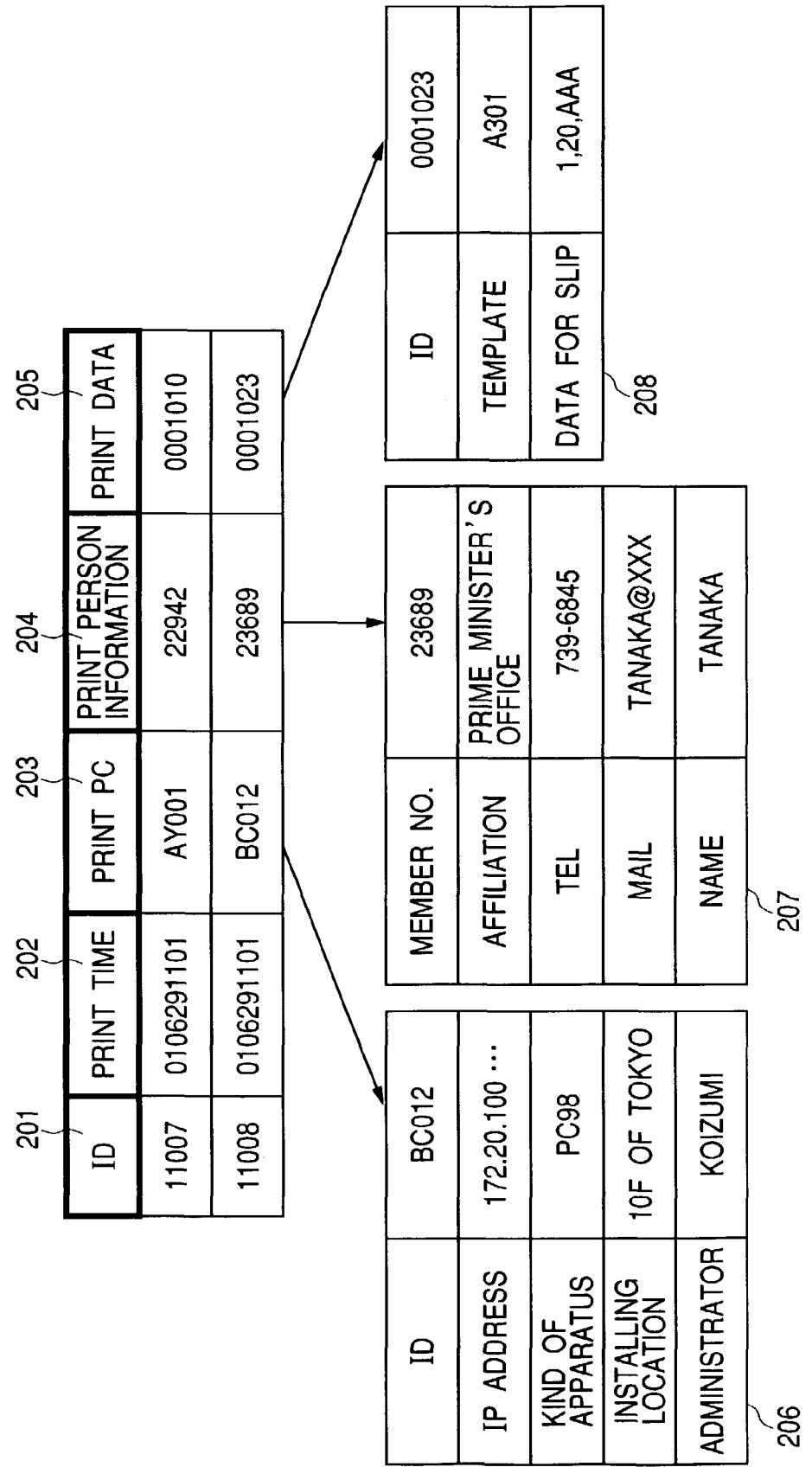
FIG. 2 is an explanatory diagram showing print history information which is stored in a history information storing unit of a server apparatus.

FIG. 2 is an explanatory diagram showing the print history information which is stored in the history information storing unit 115 of the server apparatus 109 according to the embodiment. The print history information which is stored in the history information storing unit 115 of the server apparatus 109 will be described with reference to FIG. 2. In the diagram, reference numeral 201 denotes an ID for identifying the print history information; 202 print time; and 203 identification (ID) information of the client apparatus (PC) which executed the print based on the image data for printing. Detailed information regarding the client apparatus is shown in 206 (ID, IP address, kind of apparatus, installing location, administrator). Reference numeral 204 denotes ID information of the operator (user) who executed the print based on the image data for printing. Detailed information regarding the operator is shown in 207 (member No., affiliation, telephone No., E-mail address, name). Reference numeral 205 denotes ID information of the image data for printing which was printed. Detailed information regarding the image data for printing is shown in 208 (ID, template, data for the slip).

Figure 3:
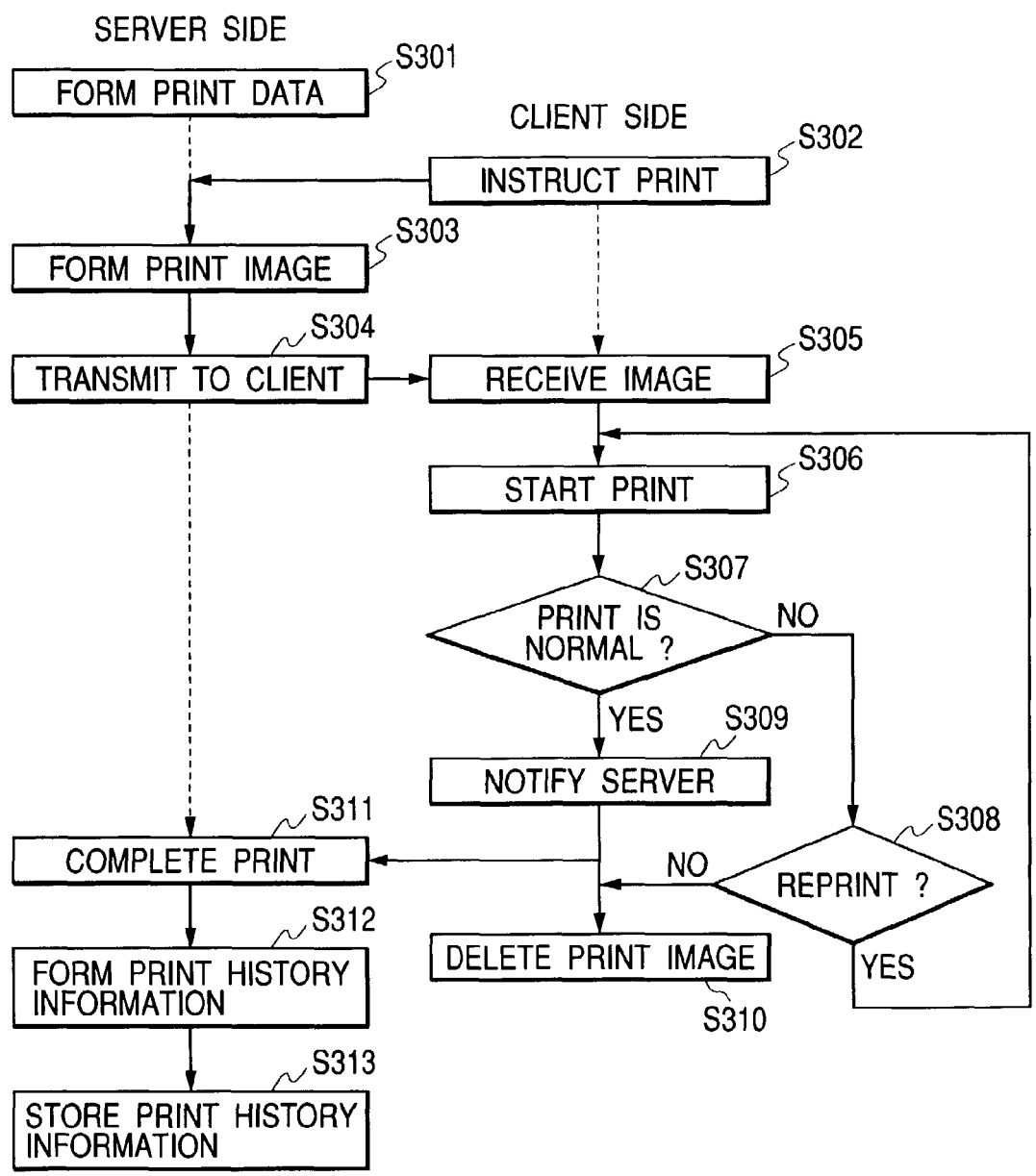
FIG. 3 is a flowchart showing the operation which is executed until completion of the print.
Figure 4:
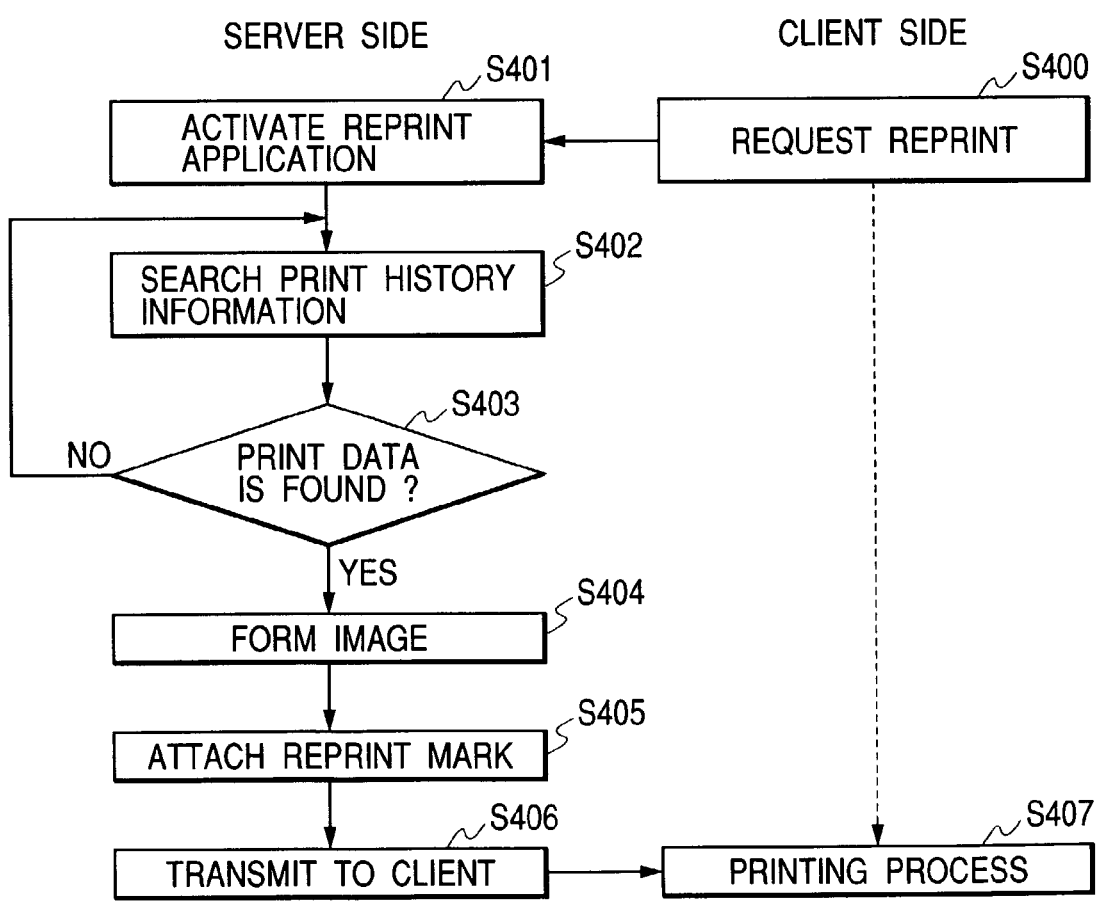
FIG. 4 is a flowchart showing a reprinting process.

The operation in the network print system according to the embodiment constructed as mentioned above will now be described in detail with reference to FIGS. 1 to 4. FIG. 3 is a flowchart showing the operation which is executed until the completion of the print according to the embodiment. FIG. 4 is a flowchart showing a reprinting process according to the embodiment. Processes on the client apparatus side in FIGS. 3 and 4 are executed by a method whereby a control unit (not shown) of the client apparatus controls the units in a range from the data display unit 101 to the data I/O unit 104. Processes on the server apparatus side in FIGS. 3 and 4 are executed by a method whereby a control unit (not shown) of the server apparatus controls the units in a range from the network communication control unit 110 to the history information analysis unit 116.

First, processing steps which are executed in a range from the execution of the print to the creation of the print history information will be described with reference to FIG. 3. In step S301, the data for a slip is formed in the server apparatus 109. In the client apparatus 100, the user inputs information necessary for forming the slip by using the Web browser. For example, in the case of forming the slip for the customer, the user inputs a name and/or a telephone number of the customer. Thus, information regarding the customer is extracted from the database 117 and the data for the slip is formed. To display an input picture plane for inputting the information necessary for forming the slip by the Web browser, the server apparatus 109 transmits HTML (Hyper Text Markup Language) data in which the input picture plane has been described to the Web browser of the client apparatus 100.

In step S302, the data I/O unit 104 transmits a print request to the server apparatus 109 in accordance with a print instruction from the user. In step S303, the image forming unit 113 forms the image data for printing on the basis of the print request received from the client apparatus 100 via the network communication control unit 110. In step S304, the network communication control unit 110 transmits the image data for printing to the client apparatus 100.

On the client apparatus 100 side, in step S305, the data I/O unit 104 receives the image data for printing from the server apparatus 109 and the print output unit 102 starts the printing process using the printing apparatus 106 on the basis of the received image data for printing. Generally, the print by the printing apparatus 106 is not immediately executed but a preview of the image data for printing is executed by the data display unit 101 and the user confirms an image based on the image data for printing.

In step S306, when the print output unit 102 of the client apparatus 100 starts the printing process, the printing apparatus 106 is made operative and executes the print based on the image data for printing. In step S307, the print management unit 103 of the client apparatus 100 grasps whether the print has normally been executed in the printing apparatus 106 or not.

If it is determined that the print is not normally executed due to a fault or the like of the printing apparatus 106, in step S308, the print management unit 103 of the client apparatus 100 discriminates whether the print is executed again or not on the basis of the presence or absence of an instruction of the operator. The print management unit 103 displays a button indicative of the reprint instruction together with a message showing that the print is not normally executed. When the user presses this button, it is determined that the reprint instruction has been issued from the operator. If the operator of the client apparatus 100 instructs the reprint, the processing routine is returned to step S306.

If the operator of the client apparatus 100 instructs to stop the print, in step S310, the client apparatus 100 allows the print management unit 103 to automatically delete the image data for printing transmitted from the server apparatus 109.

If it is determined that the print has normally been finished in the printing apparatus 106, in step S309, the data I/O unit 104 of the client apparatus 100 notifies the server apparatus 109 of a print result. After that, in step S310, in the client apparatus 100, the image data for printing transmitted at the beginning from the server apparatus 109 is deleted. By deleting the image data for printing in step S310, no image data for printing is left on the client apparatus side, so that a number of slips are not printed wastefully and security of the slips is improved.

Subsequently, in step S311, the network communication control unit 110 receives the notification showing that the print by the printing apparatus 106 has completely been finished from the client apparatus 100 side. Thus, in step S312, the history information analysis unit 116 forms the print history information. In step S313, the print history information is stored into the history information storing unit 115.

According to the flow in FIG. 3, the reprint based on the image data for printing transmitted in step S304 is executed only in the case where the print by the printing apparatus 106 is not normally finished. Therefore, it is prevented that a number of slips are printed wastefully. On the other hand, even if a failure of the print occurs, the user does not need to reinput the information necessary for the slip.

Subsequently, the reprinting operation will be described with reference to FIG. 4. In step S400, on the client apparatus 100 side, a reprint request is transmitted to the server apparatus 109 in accordance with the reprint instruction from the user. On the server apparatus 109 side, in step S401, an application for reprinting is activated. Although this application is a simple search application, only the authorized person (person in authority in which he can access the server apparatus 109) can operate this application. In step S402, the application for reprinting searches the history information storing unit 115 in which the print history information has been stored in accordance with the instruction from the user. In step S403, the server apparatus 109 discriminates whether the image data for printing which the user wants to reprint has been found from the history information storing unit 115 or not.

If the image data for printing which the user wants to reprint has been found, in step S404, the server apparatus 109 forms the image data for printing by the image forming unit 113. The image forming unit 113 reads out the template data for the slip from the slip template storing unit 112 on the basis of the ID of the template data for the slip shown in 208 in FIG. 2 and synthesizes the read-out template data for the slip and the data for the slip shown in 208 in FIG. 2, thereby forming the image data for printing. The image forming unit 113 attaches a mark showing that the image data for printing is reprinted matter.

In step S406, the network communication control unit 110 transmits the formed image data for printing to the client apparatus 100. In step S407, the print output unit 102 of the client apparatus 100 starts the reprinting process using the printing apparatus 106 on the basis of the image data for printing transmitted in step S406.

Figure 5:
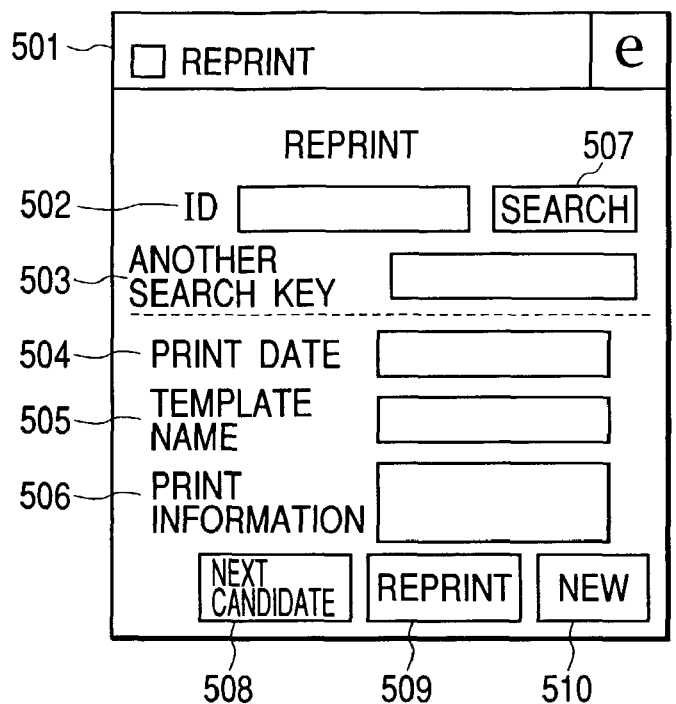
FIG. 5 is a diagram showing an operating picture plane of an application for reprinting.

FIG. 5 is a diagram showing an operating picture plane 501 of the application for reprinting. This operating picture plane is displayed via the Web browser of the client apparatus 100. Reference numeral 502 denotes an input field for inputting an ID corresponding to the image data for printing when the print based on the image data for printing was performed in the past. Reference numeral 503 denotes a keyword input field which is used for searching the image data for printing by a keyword when the ID inputted in the input field 502 is lost, or the like. As a keyword, it is inputted in a format "field name=xxxx". For example, when the user wants to search a slip in which "abc" is included in the name of the slip, "name=abc" is inputted. Thus, the image data for printing of the slip in which "abc" is included in the name is searched.

As another method, it is possible to search by using the information stored in the print history information as a keyword. For example, it is possible to perform the search such as "affiliation of the person who prints=The Prime Minister's Office", "E-mail address of the print person=Tanaka@xxx", "installing location of the print PC=10F of Tokyo", and the like.

Reference numerals 504 to 506 denote fields in which a search result is displayed. For example, a print date, a template name, and print information are displayed. Reference numeral 507 denotes a search button. When the user presses the search button 507, the search by the ID number or the search by the keyword is executed. In the case where the keyword search is executed, there can be a case where a plurality of image data for printing is detected. Therefore, a button 508 to search a desired image data for printing from them is provided.

Reference numeral 509 denotes a button to instruct the reprint. When the user presses the reprint button 509, the reprint is started on the basis of the information in the fields 504 to 506.

If the corresponding image data for printing is not found in the print history information, the user can instruct the creation of new image data for printing in order to print a new slip. An image data form button 510 is provided for this purpose. When the user selects the image data form button 510, the operating picture plane in FIG. 7 is displayed.

Figure 6:
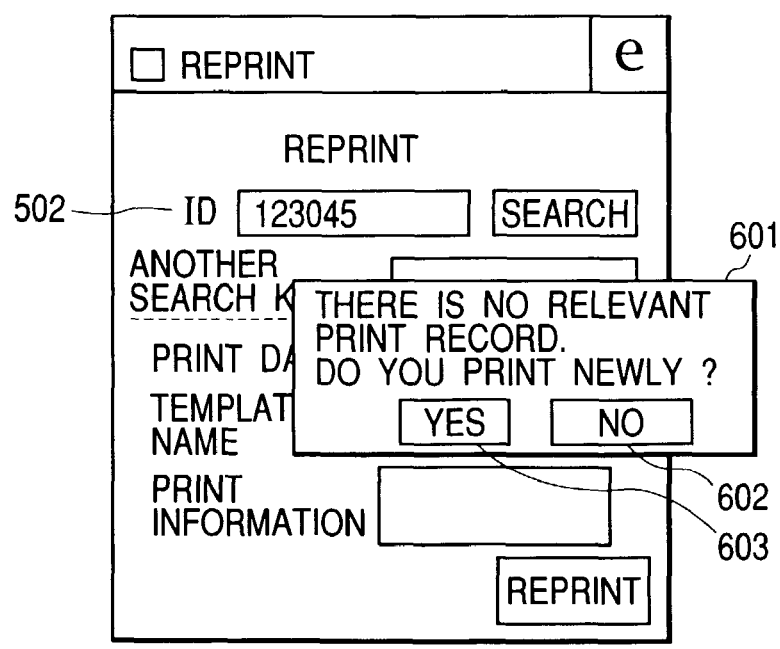
FIG. 6 is a diagram showing a message which is displayed in the case where print data cannot be found.

Similarly, if the inputted ID does not exist in the ID field 502, a message 601 is displayed as shown in FIG. 6. If the corresponding ID is not stored in the print history information although the ID has been inputted into the ID field 502 and the search of the printed image data for printing has been started, the message 601 is displayed. When the user selects a NO button 602, the picture plane of FIG. 5 is displayed again. When the user selects a YES button 603, the operating picture plane of FIG. 7 is displayed.

Figure 7:
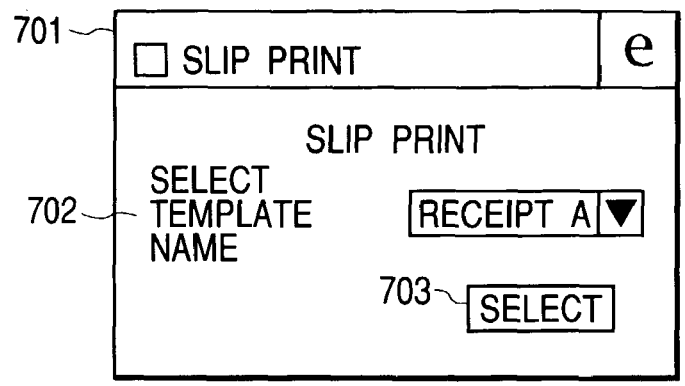
FIG. 7 is a diagram showing an operating picture plane for selecting slip template data.

On the operating picture plane of FIG. 7, the user selects template data for the slip which is used for printing the slip and presses a select button 703. Thus, the screen is switched to the operating picture plane according to the selected template data for the slip.

Figure 8:
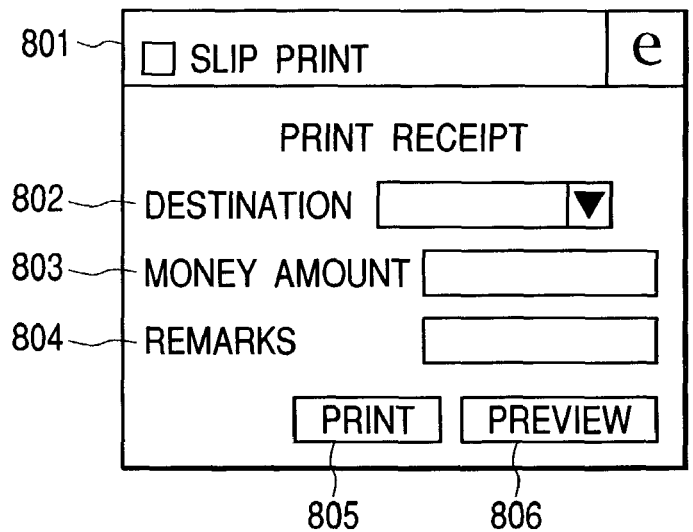
FIG. 8 is a diagram showing an operating picture plane which is displayed in the case where the slip template data of a receipt is selected.

For example, FIG. 8 shows an operating picture plane which is displayed when the template data for the slip of the receipt is selected. The user inputs necessary items in 802, 803, and 804. When the user selects a print button 805, the printing process is started. The inputted data is transmitted to the server apparatus 109. Necessary data is read out from the database 117 on the basis of the data inputted on the picture plane of FIG. 8. The image forming unit 113 synthesizes the data inputted on the picture plane of FIG. 8, the data read out from the database 117, and the template data for the slip of the receipt, thereby forming the image data for printing.

Figure 9:
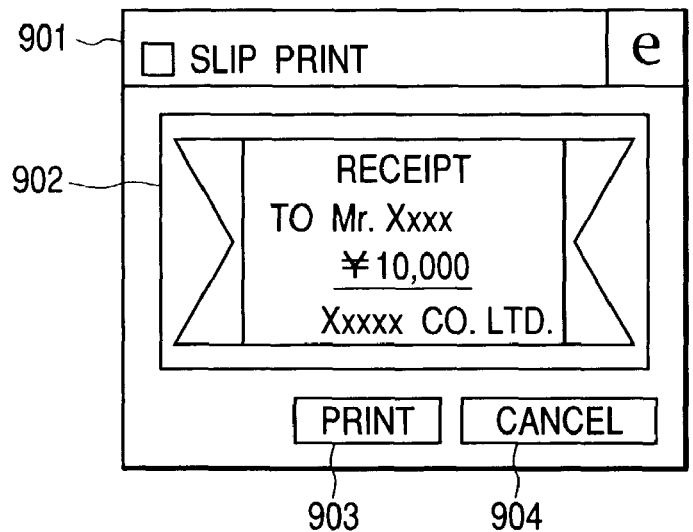
FIG. 9 is a diagram showing a preview picture plane.

When the user selects a preview button 806, a preview picture plane as shown in FIG. 9 is displayed. Reference numeral 901 denotes a window for preview; 902 a slip image of an actual receipt; and 903 a print button. When the print button 903 is selected, the printing process is started. Reference numeral 904 denotes a cancel button. When the cancel button 904 is selected, the screen is returned to the previous picture plane.

To display the picture planes of FIGS. 5 to 9 onto the Web browser, the server apparatus 109 transmits the HTML (Hyper Text Markup Language) data expressing the picture planes of FIGS. 5 to 9 to the client apparatus. Thus, the Web browser of the client apparatus interprets the transmitted HTML data and displays the picture planes of FIGS. 5 to 9.

Figure 10:
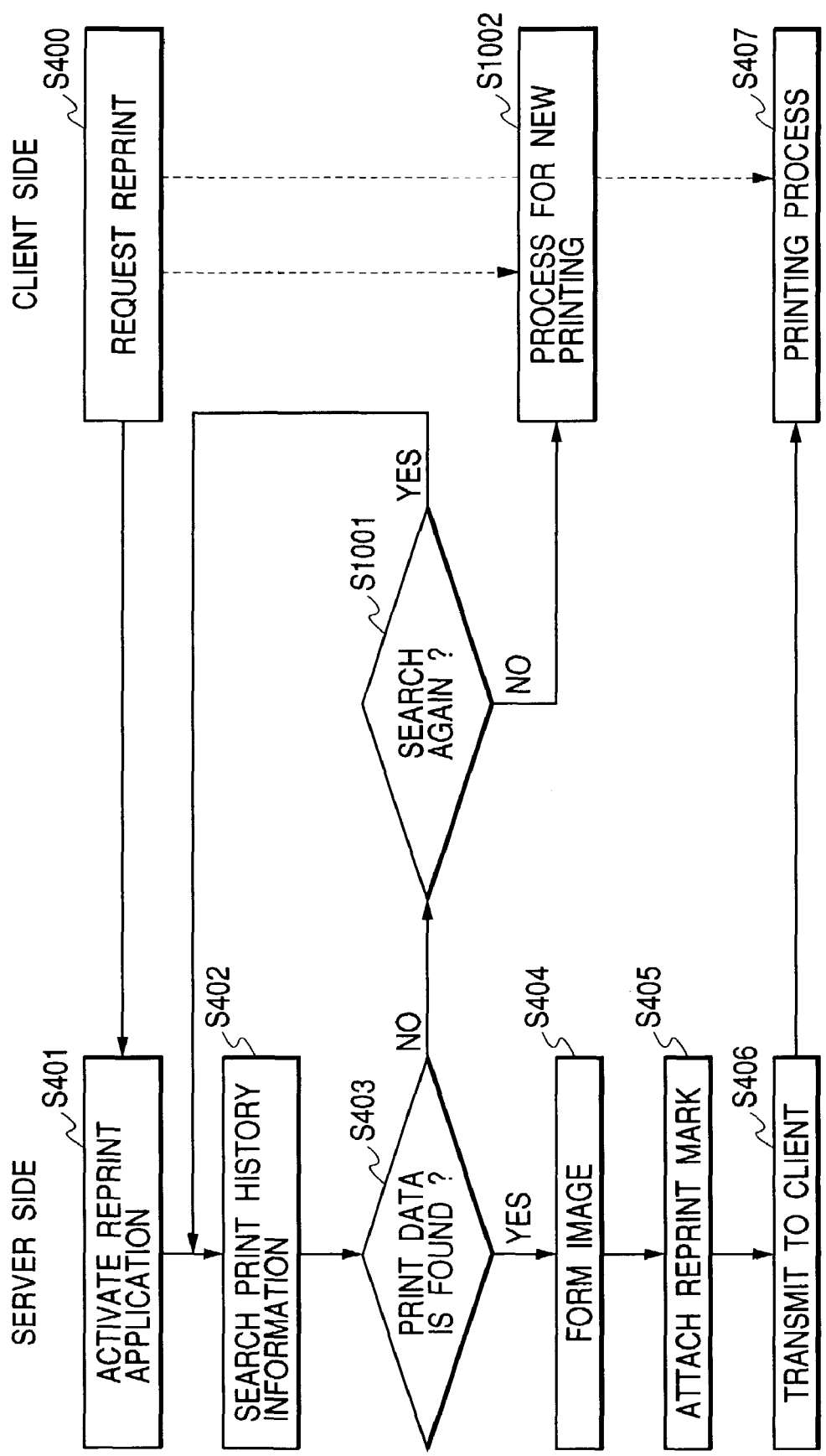
FIG. 10 is a flowchart showing the reprinting process.

FIG. 10 shows a modification of the flowchart of FIG. 4. In the flowchart of FIG. 10, if desired image data for printing is not found in the print history information, in step S1001, the message in FIG. 6 is displayed, thereby inquiring of the user about whether he executes the search again or not. In the case of performing the search again (when the NO button 602 is pressed), the processing routine is returned to step S402. In the case of shifting to the mode to form a new slip (when the YES button 603 is pressed), the operating picture planes of FIGS. 7 to 9 are sequentially displayed in step S1002.

According to the embodiment of the invention as described above, the client apparatus 100 requests the server apparatus 109 to form the image data for printing and instructs the printing apparatus 106 to print the image data for printing transmitted from the server apparatus 109. After completion of the print by the printing apparatus 106, the image data for printing is deleted. The server apparatus 109 forms the image data for printing on the basis of the request from the client apparatus 100 and forms print history information which enables the reprint on the basis of the notification of the completion of the print in the printing apparatus 106 which is sent from the client apparatus 100 or 120. Thus, the reprint using the print data stored in the client apparatus is inhibited, the security of the printed matter is improved, and the operability upon reprinting can be improved.

Specifically speaking, when the print fails, even if the user does not input the information necessary for forming the slip, the reprint based on the image data for printing is executed. On the other hand, when the print is successfully executed, the image data for printing which was printed in the past is searched in accordance with an instruction from the user in authority and the print based on the image data for printing found by the search is executed.

Other Embodiments

Although the example of the network print system with the construction shown in FIG. 1 has been mentioned in the above embodiment, the invention is not limited to the construction of FIG. 1. The number of client apparatuses, server apparatuses, and printing apparatuses which are installed can be set to an arbitrary number. An installing form of the network can be set to an arbitrary form.

Although a printing system of the printing apparatus is not mentioned in the above embodiment, the invention is not limited to the specific printing system but various kinds of printing systems such as electrophotographic system, ink jet system, thermal system, heat transfer system, electrostatic system, and the like can be used.

Although the kind of the printing apparatus is not mentioned in the above embodiment, the invention is not limited to the specific kind of printing apparatus but various kinds of printing apparatuses can be used in the case of using a printer having only a printing function, the case of using a printing function of a copying apparatus having an image reading function and a printing function, the case of using a printing function of a hybrid apparatus having a plurality of functions such as image reading function, printing function, facsimile function, etc., and the like.

The invention can be applied to a system constructed by a plurality of apparatuses or can be applied to an apparatus constructed by one equipment. Naturally, the invention is accomplished by a method whereby a medium such as a memory medium or the like in which program codes of software for realizing the functions of the embodiment mentioned above have been stored is supplied to a system or an apparatus and a computer (or a CPU or an MPU) of the system or the apparatus reads out and executes the program codes stored in the medium such as a memory medium or the like.

In this case, the program codes themselves read out from the medium such as a memory medium or the like realize the functions of the embodiment mentioned above and the medium such as a memory medium or the like in which the program codes have been stored constructs the invention. As a medium such as a memory medium or the like for supplying the program codes, for example, a floppy (registered trademark) disk, a hard disk, an optical disk, a magnetooptic disk, a CD-ROM, a CD-R, a magnetic tape, a non-volatile memory card, a ROM, means for downloading them via the network, or the like can be used.

Naturally, the invention incorporates not only a case where a computer executes the read-out program codes, so that the functions of the embodiment mentioned above are realized but also a case where an OS or the like which is operating on the computer executes a part or all of actual processes on the basis of instructions of the program codes and the functions of the embodiment mentioned above are realized by those processes.

Further, naturally, the invention also incorporates a case where the program codes read out from the medium such as a memory medium or the like are written into a memory provided for a function expanding board inserted in a computer or a function expanding unit connected to a computer and, thereafter, a CPU or the like provided for the function expanding board or the function expanding unit executes a part or all of actual processes on the basis of instructions of the program codes, and the functions of the embodiment mentioned above are realized by those processes.

As described above, according to the invention, the client apparatus makes control such that the server apparatus is requested to form the image data for printing, the printing apparatus is instructed to print the image data for printing transmitted from the server apparatus, and after completion of the print by the printing apparatus, the image data for printing is deleted, and the server apparatus makes control such that the image data for printing is formed on the basis of the request from the client apparatus and the print history information for enabling the reprint is formed on the basis of the notification showing the completion of the print by the printing apparatus which is sent from the client apparatus. Thus, the following effects can be obtained.

The reprint using the print data stored in the client apparatus is inhibited, the security of the printed matter is improved, and the operability upon reprinting can be improved.

What is claimed is:

1. A data processing method of transmitting print data from a server apparatus to a client apparatus for performing printing based on the print data at a printer connected to the client apparatus, comprising:

a receiving step of receiving, at the server apparatus, a print request for certain print data from the client apparatus;

a discriminating step of discriminating, at the server apparatus, whether the received print request is a first print request that instructs printing of the certain print data for the first time or a reprint request that instructs reprinting of the certain print data;

a data forming step of forming, at the server apparatus, print data in response to the print request from the client apparatus, when it is discriminated in said discriminating step that the received print request is the first print request;

a transmitting step of transmitting the print data formed in said data forming step from the server apparatus to the client apparatus;

a transferring step of transferring the print data transmitted in said transmitting step from the client apparatus to the printer to allow the printer to perform printing based on the print data;

a deleting step of deleting, in the client apparatus, the print data transferred in said transferring step in response to completion of the printing based on the print data at the printer, such that the print data does not exist in the client apparatus after the deletion;

a history forming step of forming, in the server apparatus, print history information for enabling reprinting with respect to the transmitted print data on the basis of a notification indicative of the completion of the printing based on the print data at the printer;

a reprint data forming step of, in the server apparatus, forming reprint data by using template data indicated by the formed print history information, in response to the reprint request from the client apparatus, when it is discriminated in said discriminating step that the received print request is the reprint request; and a second transmitting step of adding to the formed reprint data additional information indicating that printed matter to be printed based on the formed reprint data is reprinted matter and transmitting the reprint data added with the additional information from the server apparatus to the client apparatus, when it is discriminated in said discriminating step that the received print request is the reprint request, wherein the print history information formed in said history forming step includes at least (a) information specifying a template used in generating the print data and (b) slip data synthesized with the template in generating the print data, and wherein said reprint data forming step forms the reprint data by specifying print data for reprint in accordance with a user instruction and by synthesizing a template used in generating the print data with slip data synthesized with the template in generating the print data in accordance with the print history information for the print data.

2. A method according to claim 1, wherein said reprint data forming step forms the reprint print data by synthesizing data inputted by the user in the server apparatus or data stored in a database and the template data in accordance with the reprint request.

3. A method according to claim 1, further comprising a searching step of searching print history information for the template data in accordance with the reprint request, wherein said reprint data forming step forms the reprint data by synthesizing data inputted by the user in the client apparatus or data stored in a database and the template data.

4. A method according to claim 1, wherein said reprinting is executed by an instruction only from a user in authority.

5. A method according to claim 1, wherein said print history information includes at least one of information showing time of the execution of the print, identification information for identifying the user who performed the print, identification information for identifying the client apparatus, and identification information for identifying the print data.

6. A method according to claim 3, further comprising a displaying step of displaying a picture plane for inputting a searching condition necessary for the searching in said searching step, and wherein said searching step performs the searching in accordance with the searching condition inputted by said picture plane.

7. A non-transitory computer-readable storage medium storing a computer-executable program for transmitting print data from a server apparatus to a client apparatus for performing printing based on the print data at a printer connected to the client apparatus, the computer-executable program comprising:

a receiving step of receiving, at the server apparatus, a print request for certain print data from the client apparatus;

a discriminating step of discriminating, at the server apparatus, whether the received print request is a first print request that instructs printing of the certain print data for the first time or a reprint request that instructs reprinting of the certain print data;

a data forming step of forming, at the server apparatus, print data in response to a print request from the client apparatus, when it is discriminated in said discriminating step that the received print request is the first print request;

a transmitting step of transmitting the print data formed in said data forming step from the server apparatus to the client apparatus;

a transferring step of transferring the print data transmitted in said transmitting step from the client apparatus to the printer to allow the printer to perform printing based on the print data;

a deleting step of deleting, in the client apparatus, the print data transferred in said transferring step in response to completion of the printing print based on the print data at the printer, such that the print data does not exist in the client apparatus after the deletion;

a history forming step of forming, in the server apparatus, print history information for enabling reprinting with respect to the transmitted print data on the basis of a notification indicative of the completion of the printing print based on the print data at the printer;

a reprint data forming step of, in the server apparatus, forming reprint data by using template data indicated by the formed print history information, in response to the reprint request from the client apparatus, when it is discriminated in said discriminating step that the received print request is the reprint request; and a second transmitting step of adding to the formed reprint data additional information indicating that printed matter to be printed based on the formed reprint data is reprinted matter and transmitting the reprint data added with the additional information from the server apparatus to the client apparatus, when it is discriminated in said discriminating step that the received print request is the reprint request, wherein the print history information formed in said history forming step includes at least (a) information specifying a template used in generating the print data and (b) slip data synthesized with the template in generating the print data, and wherein said reprint data forming step forms the reprint data by specifying print data for reprint in accordance with a user instruction and by synthesizing a template used in generating the print data with slip data synthesized with the template in generating the print data in accordance with the print history information for the print data.

8. A non-transitory computer-readable storage medium storing a computer-executable program according to claim 7, wherein said program allows the computer to further execute a forming step of forming print data by synthesizing data inputted by the user in said information processing apparatus or data stored in a database and template data in accordance with a request from said information processing apparatus.

9. An information processing system for transmitting print data from a server apparatus to a client apparatus for performing printing based on the print data at a printer connected to the client apparatus, comprising:

a receiving means for receiving, at the server apparatus, a print request for certain print data from the client apparatus;

a discriminating means for discriminating, at the server apparatus, whether the received print request is a first print request that instructs printing of the certain print data for the first time or a reprint request that instructs reprinting of the certain print data;

data forming means for forming, at the server apparatus, print data in response to the print request from the client apparatus, when it is discriminated in said discriminating means that the received print request is the first print request;

transmitting means for transmitting the print data formed by said data forming means from the server apparatus to the client apparatus;

transferring means for transferring the print data transmitted by said transmitting means from the client apparatus to the printer to allow the printer to perform printing based on the print data;

deleting means for deleting, in the client apparatus, the print data transferred by said transferring means in response to completion of the printing based on the print data at the printer, such that the print data does not exist in the client apparatus;

history forming means for forming, in the server apparatus, print history information for enabling reprinting with respect to the transmitted print data on the basis of a notification indicative of the completion of the printing based on the transmitted print data at the printer;

reprint data forming means for, in the server apparatus, forming reprint data by using template data indicated by the formed print history information, in response to the reprint request from the client apparatus, when it is discriminated in said discriminating means that the received print request is the reprint request; and a second transmitting means for adding to the formed reprint data additional information indicating that printed matter to be printed based on the formed reprint data is reprinted matter and transmitting the reprint data added with the additional information from the server apparatus to the client apparatus, when it is discriminated in said discriminating means that the received print request is the reprint request, wherein the print history information formed in said history forming means includes at least (a) information specifying a template used in generating the print data and (b) slip data synthesized with the template in generating the print data, and wherein said reprint data forming means forms the reprint data by specifying print data for reprint in accordance with a user instruction and by synthesizing a template used in generating the print data with slip data synthesized with the template in generating the print data in accordance with the print history information for the print data.

10. A server apparatus which communicates with a client apparatus, said server apparatus comprising:

a receiving means for receiving, at the server apparatus, a print request for certain print data from the client apparatus;

a discriminating means for discriminating, at the server apparatus, whether the received print request is a first print request that instructs printing of the certain print data for the first time or a reprint request that instructs reprinting of the certain print data;

data forming means for forming print data in response to the print request from the client apparatus, when it is discriminated in said discriminating means that the received print request is the first print request;

transmitting means for transmitting the print data formed by said data forming means to the client apparatus, wherein the client apparatus transfers the print data to a printer connected to the client apparatus to allow the printer to perform printing based on the print data;

history forming means for forming, on the basis of a notification indicative of the completion of printing based on the transmitted print data at the printer, print history information for enabling reprinting with respect to the print data;

storing means for storing the print history information formed by said history forming means; and a second transmitting means for adding to the formed reprint data additional information indicating that printed matter to be printed based on the formed reprint data is reprinted matter and transmitting the reprint data added with the additional information from the server apparatus to the client apparatus, wherein the client apparatus deletes the print data transmitted by said transmitting means in response to the completion of the printing based on the transmitted print data at the printer, such that the print data does not exist in the client apparatus after the deletion, wherein said server apparatus further comprises reprint data forming means for forming reprint data by using template data indicated by the print history information formed by said history forming means in response to the reprint request from the client apparatus, when it is discriminated in said discriminating means that the received print request is the reprint request, wherein the print history information formed in said history forming means includes at least (a) information specifying a template used in generating the print data and (b) slip data synthesized with the template in generating the print data, and wherein said reprint data forming means forms the reprint data by specifying print data for reprint in accordance with a user instruction and by synthesizing a template used in generating the print data with slip data synthesized with the template in generating the print data in accordance with the print history information for the print data.

11. A server apparatus according to claim 10, wherein said reprint data forming means forms the reprint data by using data stored in a database and the template data in accordance with the reprint request.

12. A server apparatus according to claim 10, further comprising searching means for searching in the print history information for the template data in accordance with the reprint request.

13. A server apparatus according to claim 10, wherein the reprinting is executed with an instruction from a user in authority.

14. A server apparatus according to claim 10, wherein the print history information includes at least one of information showing time of the execution of the printing, identification information for identifying the user who performed the printing, identification information for identifying the client apparatus, and identification information for identifying the print data.

15. A server apparatus according to claim 12, further comprising displaying means for displaying a display screen for inputting a searching condition necessary for the searching by said searching means, wherein said searching means performs the searching in accordance with the searching condition inputted on the display screen displayed by said displaying means.

16. A method for a server apparatus which communicates with a client apparatus, said method comprising:
a receiving step of receiving, at the server apparatus, a print request for certain print data from the client apparatus;
a discriminating step of discriminating, at the server apparatus, whether the received print request is a first print request that instructs printing of the certain print data for the first time or a reprint request that instructs reprinting of the certain print data;
a data forming step of forming print data in response to the print request from the client apparatus, when it is discriminated in said discriminating step that the received print request is the first print request;
a transmitting step of transmitting the print data formed in said data forming step to the client apparatus, wherein the client apparatus transfers the print data to a printer connected to the client apparatus to allow the printer to perform printing based on the print data;
a history forming step of forming, on the basis of a notification indicative of the completion of printing based on the transmitted print data at the printer, print history information for enabling reprinting with respect to the print data;
a storing step of storing the print history information formed in said history forming step; and
a second transmitting step of adding to the formed reprint data additional information indicating that printed matter to be printed based on the formed reprint data is reprinted matter and transmitting the reprint data added with the additional information from the server apparatus to the client apparatus, when it is discriminated in said discriminating step that the received print request is the reprint request,
wherein the client apparatus deletes the print transmitted in said transmitting step data in response to the completion of the printing based on the transmitted print data at the printer, such that the print data does not exist in the client apparatus after the deletion,
wherein said server apparatus further comprises a reprint data forming step of forming reprint data by using template data indicated by the print history information formed in said history forming step, in response to the reprint request from the client apparatus, when it is discriminated in said discriminating step that the received print request is the reprint request,
wherein the print history information formed in said history forming step includes at least (a) information specifying a template used in generating the print data and (b) slip data synthesized with the template in generating the print data, and
wherein said reprint data forming step forms the reprint data by specifying print data for reprint in accordance with a user instruction and by synthesizing a template used in generating the print data with slip data synthesized with the template in generating the print data in accordance with the print history information for the print data.

17. A method according to claim 16, wherein the reprint data formed in said forming step is formed by using data stored in a database and the template data in accordance with the reprint request.

18. A method according to claim 16, further comprising a searching step of searching the print history information for the template data in accordance with the reprint request.

19. A method according to claim 16, wherein the reprinting is executed with an instruction from a user in authority.

20. A method according to claim 16, wherein the print history information includes at least one of information showing time of the execution of the printing, identification information for identifying the user who performed the printing, identification information for identifying the client apparatus, and identification information for identifying the print data.

21. A method according to claim 18, further comprising a displaying step of displaying a display screen for inputting a searching condition necessary for the searching in said searching step, wherein in said searching step, the searching is performed in accordance with the searching condition inputted on the display screen displayed in said displaying step.

22. A client apparatus that is connected to a printer and communicates with a server apparatus, said client apparatus comprising:
a first transmitting means for transmitting, to the server apparatus, a print request for certain print data from the client apparatus, wherein the server apparatus discriminates whether the received print request is a first print request that instructs printing of the certain print data for the first time or a reprint request that instructs reprinting of the certain print data;
receiving means for receiving print data from the server apparatus;
transferring means for transferring the print data received by said receiving means to the printer to allow the printer to perform printing based on the print data;
deleting means for deleting the print data transferred by said transferring means in response to completion of the printing based on the transferred print data at the printer, such that the print data does not exist in said client apparatus after the deletion; and
a second transmitting means for adding to the formed reprint data additional information indicating that printed matter to be printed based on the formed reprint data is reprinted matter and transmitting the reprint data added with the additional information from the server apparatus to the client apparatus, when it is discriminated by the server apparatus that the received print request is the reprint request, wherein the server apparatus forms print history information for enabling reprinting with respect to the print data received by said receiving means, on the basis of a notification indicative of the completion of the printing based on the print data at the printer, and wherein said client apparatus further comprises request means for requesting the server apparatus to form reprint data by using template data indicated by the print history information formed by the server apparatus, wherein the print history information formed in said history forming means includes at least (a) information specifying a template used in generating the print data and (b) slip data synthesized with the template in generating the print data, and wherein said reprint data forming means forms the reprint data by specifying print data for reprint in accordance with a user instruction and by synthesizing a template used in generating the print data with slip data synthesized with the template in generating the print data in accordance with the print history information for the print data.

23. A method for a client apparatus that is connected to a printer and communicates with a server apparatus, said program comprising:

a first transmitting step of transmitting, to the server apparatus, a print request for certain print data from the client apparatus, wherein the server apparatus discriminates whether the received print request is a first print request that instructs printing of the certain print data for the first time or a reprint request that instructs reprinting of the certain print data;

a receiving step of receiving print data from the server apparatus;

a transferring step of transferring the print data received in said receiving step to the printer to allow the printer to perform printing based on the print data;

a deleting step of deleting the print data transferred in said transferring step in response to completion of the printing based on the transferred print data at the printer, such that the print data does not exist in said client apparatus after the deletion; and a second transmitting step of adding to the formed reprint data additional information indicating that printed matter to be printed based on the formed reprint data is reprinted matter and transmitting the reprint data added with the additional information from the server apparatus to the client apparatus, when it is discriminated by the server apparatus that the received print request is the reprint request, wherein the server apparatus forms print history information for enabling reprinting with respect to the print data received in said receiving step, on the basis of a notification indicative of the completion of the printing based on the print data at the printer, and wherein said program further comprises a requesting step of requesting the server apparatus to form reprint data by using template data indicated by the print history information formed by the server apparatus, wherein the print history information formed in said history forming step includes at least (a) information specifying a template used in generating the print data and (b) slip data synthesized with the template in generating the print data, and wherein said reprint data forming step forms the reprint data by specifying print data for reprint in accordance with a user instruction and by synthesizing a template used in generating the print data with slip data synthesized with the template in generating the print data in accordance with the print history information for the print data.

24. A non-transitory computer-readable medium storing a computer program for a method for a client apparatus that is connected to a printer and communicates with a server apparatus, said program comprising:

a first receiving step of receiving, at the server apparatus, a print request for certain print data from the client apparatus, wherein the server apparatus discriminates whether the received print request is a first print request that instructs printing of the certain print data for the first time or a reprint request that instructs reprinting of the certain print data;

a receiving step of receiving print data from the other server apparatus;

a transferring step of transferring the print data received in said receiving step to the printer to allow the printer to perform printing based on the print data;

a deleting step of deleting the print data transferred in said transferring step in response to completion of the printing based on the transferred print data at the printer, such that the print data does not exist in said client apparatus after the deletion; and a second transmitting step of adding to the formed reprint data additional information indicating that printed matter to be printed based on the formed reprint data is reprinted matter and transmitting the reprint data added with the additional information from the server apparatus to the client apparatus, when it is discriminated by the server apparatus that the received print request is the reprint request, wherein the server apparatus forms print history information for enabling reprinting with respect to the print data received in said receiving step, on the basis of a notification indicative of the completion of the printing based on the print data at the printer, wherein said program further comprises a requesting step of requesting the server apparatus to form reprint data by using template data indicated by the print history information formed by the server apparatus, wherein the print history information formed in said history forming step includes at least (a) information specifying a template used in generating the print data and (b) slip data synthesized with the template in generating the print data, and wherein said reprint data forming step forms the reprint data by specifying print data for reprint in accordance with a user instruction and by synthesizing a template used in generating the print data with slip data synthesized with the template in generating the print data in accordance with the print history information for the print data.

* * * * *